3,816,621
USE OF O,O-DI-($C_1$-$C_2$ ALKYL)S-[1-($C_2$-$C_{20}$ ACYL) HYDANTOIN-3-YL]METHYL PHOSPHOROTHIO- ATES AS INSECTICIDES
Albert H. Haubein, Newark, Del., assignor to Hercules Incorporated, Wilmington, Del.
No Drawing. Application Oct. 29, 1970, Ser. No. 85,298, now Patent No. 3,687,966, which is a continuation-in- part of abandoned application Ser. No. 694,861, Jan. 2, 1968. Divided and this application Jan. 10, 1972, Ser. No. 216,858
Int. Cl. A01n 9/36
U.S. Cl. 424—200
3 Claims

ABSTRACT OF THE DISCLOSURE

Disclosed is an insecticidal composition comprising compounds of the formula:

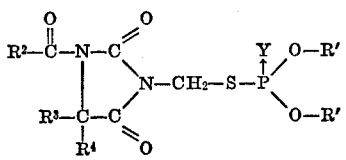

in which R' is $CH_3$ or $C_2H_5$, $R^2$ is $C_1$-$C_{19}$ alkyl, $R^3$ and $R^4$ are H or $CH_3$, and Y is O or S and a process for killing insects.

---

The application is a division of the application, Ser. No. 85,298, on which U.S. Pat. 3,687,966 was granted, which was filed Oct. 29, 1970, as a continuation-in-part of the application, Ser. No. 694,861, filed Jan. 2, 1968, now abandoned.

This invention is in the chemical arts. It relates to that part of organic chemistry relating to organophosphorus compounds and to organophosphorus insecticides.

In summary, this invention provides a new group of organophosphorus compounds represented by the formula:

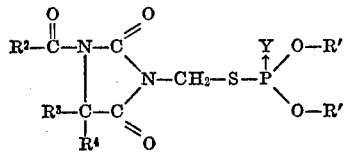

in which each R' is selected from the group consisting of $CH_3$ and $C_2H_5$, $R^2$ is $C_1$-$C_{19}$ alkyl, $R^3$ and $R^4$ are selected from the group consisting of H or $CH_3$, and Y is selected from the group consisting of O and S. In the formula, $C_1$-$C_{19}$ alkyl covers both straight and branched chain alkyls with 1-19 carbon atoms. Representative compounds of the group are listed by their structural formulas in the following Table.

The compounds of this invention in general at 20–25° C. are yellow to brown liquids. They are insoluble in water, but soluble in solvents like acetone and in solvents like benzene.

The compounds of this invention are highly toxic to insects. This is exemplified by the typical insect mortality data presented in the following Table for the representa- tive compounds listed therein. The Table also contains the physical state at 20–25° C. of each of the end products obtained when the compounds are made according to the procedures in Examples 1 and 2.

Each of the compounds of this invention is made by the following reaction procedure. A hydantoin of the formula:

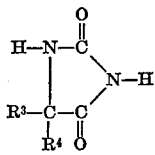

is reacted with the anhydride of a $C_1$-$C_{20}$ alkanoic acid to form the corresponding 1-acylhydantion of the for- mula:

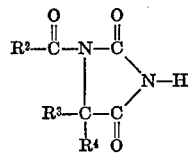

This compound is reacted with formaldehyde to form the corresponding 3-hydroxymethyl-1-acylhydantoin:

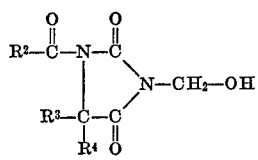

which is reacted with $PCl_5$, $PBr_3$ or the like to form the corresponding 3-chloromethyl or 3-bromomethyl com- pound:

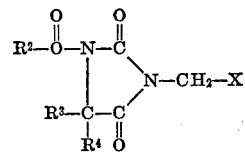

wherein X is Cl or Br. The 3-chloromethyl or 3-bromo- methyl compound is reacted with a thiophosphate of the formula:

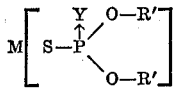

in which M is H, $NH_4$ or metallic anion, to form the compound of this invention. In the foregoing formulas $R^1$, $R^2$, $R^3$ and $R^4$ have the same meanings as in the generic formula for the compounds of this invention.

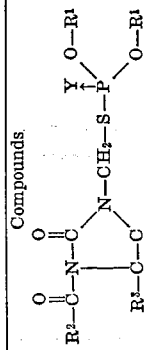

TABLE.—REPRESENTATIVE COMPOUNDS AND TYPICAL INSECT MORTALITY DATA

| Compound number | R¹ | R² | R³ | R⁴ | Y | 20-25° C. physical state | HF, percent/ percent | MBB, percent/ percent | PA, percent/ percent | SAW, percent/ percent | TSM, percent/ percent | PC, percent/ percent | CRW, percent/ percent | PA-S, percent/ p.p.m. | TSM-S, percent/ p.p.m. | SAW-S, percent/ p.p.m. | SAW-S-ST, per-cent/lb. per acre |
|---|---|---|---|---|---|---|---|---|---|---|---|---|---|---|---|---|---|
| 1 | CH₃ | CH₃ | H | H | S | Yellow viscous liquid | 92/05 | 30/005 | 100/.005 | 100/05 | 10/005 | 60/05 | 60/05 | 100/10 | 0/10 | 0/50 | |
| 2 | CH₃ | CH₃ | CH₃ | H | O | ...do... | 48/05 | 100/005 | 100/.005 | 0/.1 | 90/01 | 0/05 | 0/.1 | 100/10 | 0/50 | 100/50 | |
| 3 | CH₃ | CH₃ | CH₃ | H | S | Yellow liquid | 100/05 | 100/005 | 80/005 | 80/05 | 100/01 | 100/05 | 0/05 | | 80/50 | 30/50 | |
| 4 | CH₃ | CH₃ | CH₃ | CH₃ | O | ...do... | 100/05 | 100/001 | 100/01 | 60/.1 | 80/.1 | 40/05 | 80/05 | | 60/10 | 90/50 | |
| 5 | CH₃ | CH₃ | CH₃ | CH₃ | S | ...do... | 24/05 | 100/005 | 0/005 | 100/005 | 40/01 | 100/025 | 100/05 | 90/10 | 0/10 | 0/50 | |
| 6 | C₂H₅ | CH₃ | CH₃ | H | O | Yellow viscous liquid | 100/05 | 100/005 | 100/.005 | 70/05 | 60/01 | 60/05 | 60/05 | 100/10 | 100/10 | 100/50 | |
| 7 | C₂H₅ | CH₃ | CH₃ | H | S | Solid | 100/0025 | 80/005 | 0/.1 | 0/.1 | 0/.1 | 100/025 | 0/05 | 100/10 | 0/50 | 0/50 | |
| 8 | C₂H₅ | CH₃ | H | H | S | Yellow viscous liquid | 88/05 | 0/05 | 100/.001 | 90/05 | 100/.1 | 60/01 | | 100/10 | 100/10 | 100/50 | |
| 9 | C₂H₅ | C₂H₅ | H | H | S | Yellow liquid | 40/025 | 100/005 | 100/.001 | 100/.1 | 100/.1 | | | 100/50 | 100/50 | 0/50 | |
| 10 | CH₃ | CH₃ | H | H | S | ...do... | 80/05 | 100/005 | 100/.001 | 100/.1 | 60/.1 | 100/.1 | 100/005 | 100/10 | 100/50 | 0/50 | |
| 11 | CH₃ | n-C₃H₇ | H | H | S | Brown liquid | 100/05 | 100/005 | 100/001 | 100/.1 | 90/01 | 0/.1 | 0/05 | 100/10 | 100/50 | 100/50 | |
| 12 | CH₃ | n-C₃H₇ | H | H | S | Pale yellow liquid | 28/025 | 0/005 | 100/.001 | 100/05 | 20/005 | 100/05 | 80/05 | 100/10 | 100/10 | 100/50 | |
| 13 | CH₃ | n-C₄H₉ | H | H | O | ...do... | 100/025 | 100/001 | 0/.025 | 20/025 | 70/005 | 80/025 | 20/005 | 100/10 | 100/50 | 100/10 | 100/.5 |
| 14 | CH₃ | n-C₄H₉ | H | H | S | White crystals | 12/025 | 60/005 | 100/001 | 100/025 | 70/005 | 100/01 | 60/005 | | | | 100/.5 |
| 15 | CH₃ | n-C₅H₁₁ | H | H | O | ...do... | 52/025 | 100/001 | 100/001 | 100/01 | 80/005 | 100/01 | 100/05 | 100/10 | 100/50 | 100/10 | 100/.5 |
| 16 | CH₃ | n-C₅H₁₁ | H | H | S | Pale yellow liquid | 0/025 | 0/005 | 100/001 | 100/01 | 20/005 | 100/01 | 100/005 | 100/5 | 100/5 | 100/5 | 100/.5 |
| 17 | CH₃ | n-C₆H₁₃ | H | H | O | ...do... | 16/025 | 100/001 | 100/001 | 20/025 | 80/005 | 60/025 | 20/005 | | | | 100/.5 |
| 18 | CH₃ | n-C₆H₁₃ | H | H | S | Yellow liquid that slowly crystallized on standing | 0/025 | 100/005 | 40/025 | 30/025 | 60/005 | 40/025 | 80/005 | 100/50 | 100/50 | 40/50 | |
| 19 | CH₃ | n-C₇H₁₄ | H | H | S | Brown liquid | 0/025 | 100/005 | 100/005 | 0/025 | 0/025 | 100/025 | 0/005 | 100/50 | 100/50 | 60/50 | |
| 20 | CH₃ | n-C₁₁H₂₃ | H | H | S | | | | | | | | | | | | |

Legend: 005=.005, 05=.05, 01=.01; HF=House Fly; MBB=Mexican Bean Beetle; PA=Pea Aphid; SAW=Southern Armyworm; TSM=Two Spotted Mite; PC=Plum Curculio; CRW=Corn Root Worm; PA-S=Pea Aphid Systemic; TSM-S=Two Spotted Mite-Systemic; SAW-S=Southern Armyworm-Systemic; SAW-S-ST=Southern Armyworm-Systemic-Seed Treatment.

For insecticidal uses the compounds of this invention preferably are incorporated into a dispersible composition. The composition comprises an effective quantity of insecticidal material, and application aid material.

The insecticidal material consists essentially of at least one compound of this invention. In some embodiments of this composition the insecticidal material comprises only one compound of this invention. In other embodiments the insecticidal material comprises two or more compounds of this invention. In still other embodiments, it comprises other substances having insecticidal activity.

Specific embodiments of the composition of this invention range from concentrates of the insecticidal material to the ultimate composition that is applied to the habitat of the insect or insects to be controlled. Accordingly, an effective concentration of the insecticidal material in the composition of this invention is in a broad range, generally being from about 0.1 to about 90% by weight of the composition. Higher and lower concentrations, however, are within the broader scope of this invention. In concentrate embodiments, the concentration of the insecticidal material generally is in a range from about 10 to about 90% by weight of the composition and preferably in a range from about 10 to about 50% by weight of the composition. In the ultimate use embodiments, the concentration generally is in a range from about 0.1 to about 20% by weight of the composition and preferably in a range from about 0.5 to about 10% by weight of the composition.

Application aid material is generally inert material that facilitates distribution or dispersion of the insecticidal material when it is applied to insect habitats. It encompasses diluents, carriers, extenders, surfactants, spreading agents, sticking agents, wind drift control agents, and the like.

In those embodiments of the composition of this invention, which are normally solid, the application aid material generally comprises an inert solid in a divided condition.

Some embodiments of the solid composition are granular, while others are dispersible powders or dusts.

The granular compositions are of the coated type, the impregnated type or the incorporated type.

The coated type of granular composition is made by dusting a wettable powder or ground powder comprising the insecticidal material onto granular carrier material which either before or after the dusting has been admixed with an adhesive or a sticker. Water, oils, alcohols, glycols, aqueous gums, waxes and the like including mixtures thereof, are used as stickers. Examples of granular carrier material include attaclay, corn cobs, vermiculite, walnut hulls and almost any granular mineral or organic material screened to the desired particle size (generally 15–60 mesh, preferably about 30 mesh, U.S. screen size). Generally the insecticidal material is about 2–20% by weight of the composition, the sticker is generally about 5–40% by weight of the composition, and the granular carrier material is generally about 60–93% by weight of the composition.

In the case of the impregnated type of granular composition, the insecticidal material as such when liquid or after melting, or dissolved in a solvent, is sprayed on or poured into the granular carrier material. The solvent can be removed by evaporation, or permitted to remain. In either case, the insecticidal material impregnates the particles of the granular carrier material. Examples of the granular carrier material include those just mentioned with respect to the coated type of granular composition. The insecticidal material is generally about 2-20% by weight of the composition, while the granular carrier material is generally about 80–98% by weight of the composition.

The incorporated type of granular composition is made by admixing the insecticidal material with an inert finely divided solid such as, for example, clay, carbon, plaster of Paris and the like, and made into a mud with water or other inert evaporable liquid. The mud is then dried to a solid sheet or cake, broken up or comminuted, and screened to the desired particle size (generally 15–60 mesh, preferably about 30 mesh, U.S. screen size). In other embodiments, the mud is put into a granular pan and granules are formed therein with subsequent removal of the water or solvent. In still another procedure, the mud is extruded through a die into rods which are cut into small pieces. In the incorporated type of granular composition, the insecticidal material generally is about 2–50% by weight of the composition, and the solid carrier material is about 50–98% by weight of the composition.

In all granular embodiments of the composition of this invention, various additives in minor concentrations relative to the carrier material also can be present.

In other embodiments of the solid composition of this invention, the carrier is usually a dispersible inert solid. A typical dispersible solid of this type is clay. Other suitable solids (dispersible solid) include talc, attapulgite, pyrophyllite, diatomaceous earth, kaolin, aluminum magnesium silicate, montmorillonite, fuller's earth, sawdust and the like. The solid dispersible composition can be air dispersible, in which case it is usually referred to as a dust. Generally, when it is intended that the composition be water dispersible, the composition preferably contains emulsifying material (one or more surfactants) at a concentration sufficient to enable a suspension of the desired degree of stability to be formed when the composition is admixed with a suitable quantity of water. The composition in such case is usually referred to as a wettable powder. A typical dispersible solid composition of this invention generally comprises about 10–50% by weight of insecticidal material, about 50–90% by weight of solid carrier material and, when emulsifying material is present, about 1–10% by weight of emulsifying material.

Other specific embodiments of the insecticidal composition of this invention comprise homogeneous liquid solutions of insecticidal material in inert, preferably volatile, usually water immiscible solvents for the insecticidal material. Examples of suitable solvents include isophorone, cyclohexanone, methyl isobutyl ketone, xylene, and the like. Such a solution, which can be regarded as a concentrate, typically comprises about 10–50% by weight of insecticidal material and about 50–90% by weight of solvent. The solution can be applied as is, or diluted with more solvent, or dispersed in water, or water dispersed in it. Preferably, when it is intended that the solution be dispersed in water or water dispersed in it, the mixture of solution and water also comprises emulsifying material at a concentration sufficient to enable a dispersion (an aqueous emulsion) of the desired degree of stability to be formed when the solution or concentrate is mixed with water. A typical emulsifying material concentration is about 1–10% by weight of the concentrate. The water concentration generally is such that the insecticidal material concentration preferably is about 0.5–10% by weight of the total composition.

Examples of the surfactants employed in both the liquid and solid compositions of this invention comprise the well-known surface active agents of the anionic, cationic and non-ionic types and include alkali metal (sodium or potassium) oleates and similar soaps, amine salts of long chain fatty acids (oleates), sulfonates, animal and vegetable oils (fish oils and castor oil), sulfonated acyclic hydrocarbons, sodium salts of lignin sulfonic acids, alkylnaphthalene sodium sulfonates, sodium lauryl sulfonate, disodium monolauryl phosphate, sorbitol laurate, pentaerythritol monostearate, glycerol monostearate, polyoxyethylene, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethylammonium bromide, and cetyl dimethylbenzylammonium chloride. Still other examples are listed in "Detergents and Emulsifiers—1968 Annual" by John W. McCutcheon.

In addition to the insecticidal material and application aid material, some specific embodiments of the insecticidal composition of this invention comprise one or more other components, examples of which include insect attractants, herbicides, fungicides, plant nutrients, and the like.

The insecticidal composition of this invention is used by applying it by conventional ways and means to the habitats of the insects to be controlled. When it is desired to take advantage of the systemic toxicity of systemically active insecticidal material, the composition is applied as by spraying to the seeds of plants on which the systemically affected insects feed prior to planting, by laying or drilling the composition in granular form next to or with the seeds being planted, or spraying or dusting the leaves of the growing plants in the early stages of their growth.

The rate of application of the composition of this invention is such as to provide an effective concentration of the insecticidal material in the insect habitat to which the composition is applied. This varies with the insect or insects to be controlled, and the composition of the insecticidal material.

The best mode now contemplated of carrying out this invention is illustrated by the following working examples of various aspects of this invention, including specific embodiments. This invention is not limited to these specific embodiments. In these examples all percentages are by weight unless otherwise indicated, all parts by weight are indicated by "w.," all parts by volume are indicated by "v.," and each part by weight (w.) bears the same relationship to etch part by volume (v.) as the kilogram does to the liter.

EXAMPLE 1

This example illustrates how to make Compound No. 15 of the Table, which is O,O-dimethyl S-(1-hexanoylhydantoin-3-yl)-methyl phosphorodithioate.

A mixture of hexanoic anhydride (102 w.), hydantoin (34 w.) and concentrated $H_2SO_4$ (0.05 w.) is heated at 150° C. for 12 hours. On cooling, crystals typically form. Benzene (100 v.) is added and the mixture warmed until the crystals go into solution. Hexane is aded until the solution becomes cloudy, and the reaction mixture cooled to 20–25° C. The resulting crystals (44.6 w.) are collected and recrystallized from benzene-hexane. They typically are white and having a melting point of 75–77° C. They consist essentially of 1-hexanoylhydantoin.

To the 1-hexanoylhydantoin product (20 w.) in n-butyl acetate (160 v.) are added paraformaldehyde (3 w.) and pyridine (0.13 w.). The resulting solution is refluxed for 5 hours, cooled, and hexane is added until the solution becomes cloudy. After standing a short time, crystals form. These crystals are removed by filtration from the reaction mixture, and residual solvent is removed by evaporation. The product (13.2 w.) typically has a melting point of 96–98° C. It consists essentially of 1-hexanoyl-3-hydroxymethyl hydantoin.

To 1-hexanoyl-3-hydroxymethyl hydantoin (49.9 w.) made as above and suspended in methylene chloride (75 v.) and cooled to minus 15-minus 25° C., potassium tribromide (18.5 w.) is added over a period of 30 minutes. The resulting mixture is stirred one hour at 20–25° C. and refluxed for three hours. The reaction mass is cooled to 20–25° C. and washed three times with brine. The solvent is removed at 18 millimeters of mercury pressure to a pot temperature of 80° C. The residue is recrystallized from carbon tetrachloride-hexane to give a typically white crystalline product (35.6 w.) having a melting point of 45–46° C. This product consists essentially of 3-bromomethyl-1-hexanoylhydantoin.

To the 3-bromomethyl-1-hexanoylhydantoin product (29 w.) in acetonitrile (100 v.) is added with stirring ammonium dimethyl phosphorodithioate (17.5 w.). The reaction is slightly exothermic, the temperature of the reaction mixture increasing from 25 to 32° C. without external cooling. Ammonium chloride precipitates as the reaction proceeds. After 16 hours at 20–25° C. the stirred suspension is heated to 55° C. for 2¼ hours, cooled, poured into water, and extracted with diethyl ether. The ether extract is washed with water, dried over anhydrous sodium sulfate, and the solvent removed under a vacuum of 18 millimeters mercury pressure to a pot temperature of 80° C. The residue is then topped at 80° C. and 0.5 millimeter of mercury pressure to leave a typically yellow liquid (31.2 w.). It is recrystallized from benzene-petroleum ether to give the desired product which typically is in the form of white crystals, the melting point of which is 65–67° C. This product consists essentially of O,O-dimethyl S-(1-hexanoylhydantoin-3-yl) methyl phosphorodithioate.

In similar manner the other dithioate compounds of this invention are made from $C_1$–$C_{20}$ alkanoic anhydrides, a hydantoin selected from the group consisting of hydantoin, 5-methyl-hydantoin and 5,5-dimethyl hydantoin, and an ammonium phosphorodithioate selected from the group consisting of ammonium O,O-dimethyl phosphorodithioate, ammonium O,O-diethyl phosphorodithioate and ammonium O-methyl O-ethyl phosphorodithioate.

EXAMPLE 2

This example illustrates how to make Compound No. 16 of the Table, which is O,O-dimethyl S-(hexanoylhydantoin-3-yl) methyl phosphorothioate.

To a 3-bromomethyl-1-hexanoylhydantoin product (78 w.) made according to Example 1 and in acetonitrile (165 v.) is added with stirring ammonium dimethyl phosphorothioate (42.9 w.). The procedure described in Example 1 for reacting the 3-bromomethyl compound with the ammonium compound and for obtaining the desired end product is followed. The product thus obtained is typically a pale yellow liquid consisting essentially of O,O-dimethyl S-(1-hexanoylhydantoin-3-yl) methyl phosphorothioate.

In similar fashion the monothioate compounds of this invention are made from $C_1$–$C_{20}$ alkanoic anhydrides, a hydantoin selected from the group consisting of hydantoin, 5-methylhydantoin and 5,5-dimethylhydantoin, and an ammonium phosphorothioate selected from the group consisting of ammonium O,O-dimethyl phosphorothioate, ammonium O,O-diethyl phosphorothioate, and ammonium O-methyl O-ethyl phosphorothioate.

EXAMPLE 3

This example illustrates a water emulsifiable concentrate formulation in which the compounds of this invention can be incorporated.

The formulation is:

| Components: | Concentration |
| --- | --- |
| Toxic material | 1 w. |
| Polyoxyethylene (20) sorbitan monolaurate | 1 v. |
| Toluene or benzene | 1 v. |

The toxic material consists essentially of one or more compounds of this invention. The polyoxyethylene (20) sorbitan monolaurate is an emulsifier in which the oxyethylene content averages about 20 mole percent.

The concentrate of this formulation is made by admixing the components at 20–25° C.

The concentrate is used, for example, by admixing it with water until the toxic material in the resulting emulsion is at the desired concentration, and the emulsion thus formed is applied to the habitat of the insect to be controlled.

The test data in the Table were obtained by incorporating each compound listed in the Table into an emulsifiable concentrate of the foregoing formulation, admixing portions of the concentrate with water to give emulsions with the toxic material at the concentrations indicated in the Table, and then applying these emulsions according to the following standard, routinely carried out test procedures.

House fly—25 unsexed 3 to 4 day old house flies immobilized by $CO_2$ are placed in a 14 mesh screen wire cage (5.5 mesh/cm., wire size 0.0355 cm. diameter, mesh opening 1.45 mm.), cylindrical in shape, with a 12.7 cm. diameter and a 5 cm. depth, and sprayed with a controlled mist-like dispersion of emulsion in an enclosed tower for 10 seconds. After spraying, the cages of flies are placed in a holding room at 78° F. and 50% relative humidity, and a 5% aqueous sugar solution is placed in the cage for feeding purposes. The number of flies killed is determined 24 hours later.

Mexican bean beetle—A freshly cut 7 cm. leaf of a lima bean plant is supported by its stem placed in a cotton-stoppered 3.5 ml. water-filled vial, and the leaf is sprayed on the upper surface with emulsion, and allowed to dry. The leaf in its vial is placed in a plastic sandwich box 11 cm. x 13 cm. x 4 cm. with 10 Mexican bean beetle larvae (2nd to 3rd instar) and kept at 78° F. and 50% relative humidity for 48 hours. The dead larvae are then counted.

Pea aphid—A small pea plant is placed in a cylindrical wire-screen cage, 10 adult pea aphids are sprayed with emulsion, and placed on the plants. The cage is stored for 24 hours at 60–65° F. and 50% relative humidity. The percent mortality is then determined.

Two-spoted mite—Lima bean seedlings 5 to 6 days old are infested with 50 phosphate resistant two-spotted mites at various growth stages, and the emulsion is sprayed on both sides of the leaves of the infested plants to runoff. The seedling stems are placed in fresh water, and the infested plants kept at 78° F. and 50% relative humidity for 6 days. Then the mortality is determined.

Plum curculio—Small green apples are sprayed with emulsion, dried and placed in plastic cups infested with 10 adult curculios. After storage of the cups for 6 days at 78° F. and 50% relative humidity, the number of dead curculios is determined.

Corn root worm—In a 15 ml. plastic cup are placed a freshly sprouted kernel of corn, and on top of the kernel 10 cc. of damp sand so that the sprout is completely covered. This cup is then placed in a spray chamber in which a spray of the emulsion is directed into the cup for 10 seconds. The quantity of spray involved is the same as required to moisten the leaf surfaces in the above tests. In this test, the top surface of the sand receives the spray. On top of this treated sand is sprinkled a thin layer (about 1 mm.) of dry sand. On top of the dry sand are placed five 10-day-old larvae of the corn root worm, and the cup is covered to keep the larvae in. After 48 hours at 78° F. and 50% relative humidity, the cup is examined for dead larvae and the mortality count made.

Two-spotted mite and pea aphid, systemic—Potted lima bean seedlings (5 to 6 days old) which have been grown under the temperature and relative humidity conditions of the test are placed in culture tubes containing emulsion. After 24 hours, 50–100 two-spotted mites are placed on the leaves of one such seedling, and 10 adult aphids on another. These culture tubes are then stored at 78° F. and 50% relative humidity. The mortality of aphids is determined after 2 days, and the mortality of mites is ascertained after 6 days.

Southern armyworm—A freshly cut 7 cm. leaf of a lima bean plant is supported by its stem placed in a cotton-stoppered 3.5 ml. water-filled vial, and the leaf is sprayed on the upper surface with emulsion and then allowed to dry. The leaf in its vial is placed in a plastic sandwich box 11 cm. x 4 cm. with 10 armyworm larvae (3rd to 4th instar), and held at 78° F. and 50% relative humidity for 48 hours, and the mortality determined at the end of this time.

Southern armyworm—Systemic—This test is carried out in the same manner as the pea aphid systemic test, except ten 2nd-3rd instar larvae of the southern armyworm are used.

Southern armworm—systemic-seed treatment—In this test soil is placed in an aluminum dish about 5 inches long. Five lima bean seeds are planted in a furrow in the soil. The seeds in the furrow are sprayed with emulsion at a rate equivalent to 5 pounds per acre of the toxic material being tested. The seeds are covered with soil and the dish is placed in a greenhouse under temperature and humidity conditions favorable for rapid germination and sprouting. A week later, the resulting bean leaves are infested with ten 2nd-3rd instar larvae of the southern armworm. After storage for 48 hours under the same temperature and humidity conditions, mortality counts are taken.

Thus, this invention provides valuable compounds and compositions for insect control. A surprising aspect of the compounds of this invention is that as the number of carbon atoms in the $C_2$–$C_{20}$ acyl group at the "1" position of the hydantoinyl moiety increases in the range of 2 through 20, the insecticidal activity of the molecule remains high. In other insecticidal organo-phosphorus molecules, the insecticidal activity decreases as molecular weight increases.

A feature of advantage of the compounds of this invention is that they in general are substantially more effective as systemic toxicants for the southern armyworm than comparable compounds in the prior art.

Still another feature of advantage of the compounds of this invention is that they have substantially less mammalian toxicity than comparable compounds in the prior art.

These and other features, advantages and specific embodiments of this invention will become readily apparent to those exercising ordinary skill in the art after reading the foregoing disclosures. Such specific embodiments are within the scope of the claimed subject matter unless expressly indicated to the contrary by claim language. Moreover, while specific embodiments of this invention have been described in considerable detail, variations and modifications of them can be effected without departing from the spirit and scope of the invention as disclosed and claimed.

The term "consisting essentially of" as used in this specification excludes any unrecited substance at a concentration sufficient to substantially adversely affect the essential properties and characteristics of the composition being defined, while permitting the presence of one or more unrecited substances at concentrations insufficient to substantially adversely affect said essential properties and characteristics.

What I claim and desire to protect by Letters Patent is:

1. An insecticidal composition, which comprises an insecticidally effective amount of insecticidal material represented by the formula:

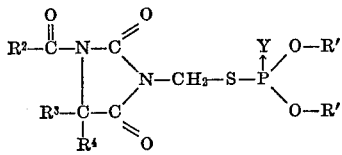

wherein R' is $CH_3$ or $C_2H_5$, $R^2$ is alkyl having 1–19 carbon atoms, $R^3$ and $R^4$ are H or $CH_3$, and Y is O or S, and an inert application aid material.

2. A method for the control of an insect, which comprises applying to the insect-infested habitat of said insect an insecticidally effective amount of insecticidal material represented by the formula:

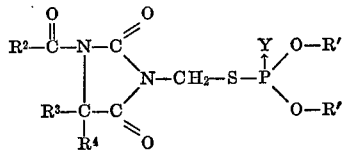

wherein R' is $CH_3$ or $C_2H_5$, $R^2$ is alkyl having 1–19 carbon atoms, $R^3$ and $R^4$ are H or $CH_3$, and Y is O or S.

3. A method according to claim 2 in which the insect is the southern armyworm, and said material is applied to the seeds of a plant on which said insect feeds.

References Cited
UNITED STATES PATENTS 2,844,582   7/1958   Raley, Jr. _____ 260—309
2,928,841   3/1960   McConnell et al. ____ 260—309.5

OTHER REFERENCES

Judge, Chemical Abstracts, 1970, vol. 72, No. 54031r.

ALBERT T. MEYERS, Primary Examiner

D. R. ORE, Assistant Examiner

PO-1050
(5/69)

UNITED STATES PATENT OFFICE
CERTIFICATE OF CORRECTION

Patent No. 3,816,621  Dated June 11, 1974

Inventor(s) Albert H. Haubein

It is certified that error appears in the above-identified patent and that said Letters Patent are hereby corrected as shown below:

Column 3 of the printed patent, in the Table under column headed " PA, percent/percent ", opposite Compound 5, " 0/005 " should read -- 80/005 --.

Signed and sealed this 1st day of October 1974.

(SEAL)
Attest:

McCOY M. GIBSON JR.
Attesting Officer

C. MARSHALL DANN
Commissioner of Patents